United States Patent [19]
Pound et al.

[11] 4,410,056
[45] Oct. 18, 1983

[54] HYDRAULIC CAB TILTING SYSTEM HAVING FULL LOCKING WITH CONTROLLED FREE-FALL

[75] Inventors: Virgil E. Pound, San Jose; James R. Jensen, Sunol; Albert C. Zwicky, Hayward, all of Calif.

[73] Assignee: PACCAR Inc., Bellevue, Wash.

[21] Appl. No.: 267,464

[22] Filed: May 27, 1981

[51] Int. Cl.³ .............................................. B62D 33/06
[52] U.S. Cl. ................................ 180/89.15; 91/437; 91/450
[58] Field of Search .................... 180/89.14, 89.15; 91/436, 437, 438, 439, 450

[56] References Cited

U.S. PATENT DOCUMENTS

| | | | |
|---|---|---|---|
| 2,873,762 | 2/1959 | Tennis | 137/596.13 |
| 2,980,135 | 4/1961 | Tennis | 91/436 |
| 3,438,307 | 4/1969 | Ahlenius | 91/436 |
| 3,473,443 | 10/1969 | Mikkelsen | 91/437 |
| 3,761,123 | 9/1973 | Neill et al. | 180/89.15 |
| 3,801,151 | 4/1974 | Reynolds et al. | 180/89.15 |
| 3,944,017 | 3/1976 | Foster | 180/89.15 |
| 3,965,587 | 6/1976 | Johns, Jr. | 91/436 |
| 4,081,053 | 3/1978 | Sherman | 180/89.15 |
| 4,194,436 | 3/1980 | Imada | 91/436 |

*Primary Examiner*—Robert R. Song
*Assistant Examiner*—Dennis Pedder
*Attorney, Agent, or Firm*—Owen, Wickersham & Erickson

[57] ABSTRACT

An hydraulic tilt system and method for its use with a cab pivotally mounted on a motor vehicle frame. An hydraulic piston-cylinder assembly pivotally connects between the cab and the frame. A remote control station has an hydraulic pump, a reservoir, and a control for operating the pump to tilt the cab. Hydraulic lines connect the control station with the piston-cylinder assembly. Check valves in the hydraulic lines stop the tilting motion of the cab in case of loss of hydraulic pressure. A controlled return free-fall valve is also disposed in the hydraulic lines to selectively restrict the flow of hydraulic fluid.

16 Claims, 7 Drawing Figures

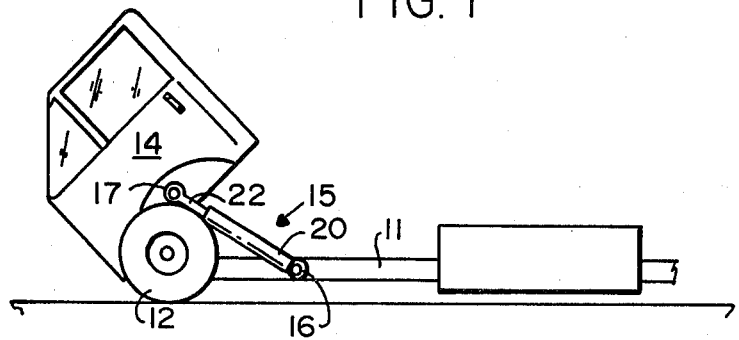
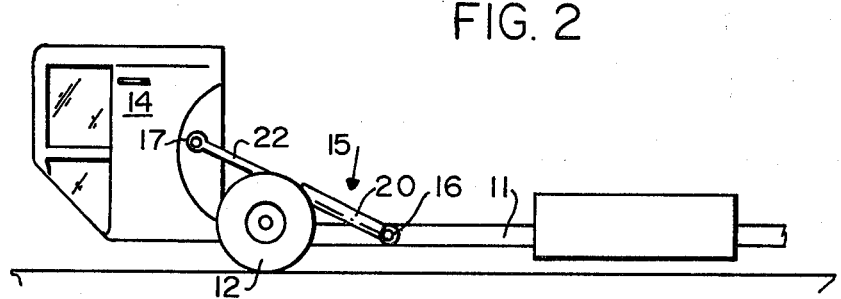
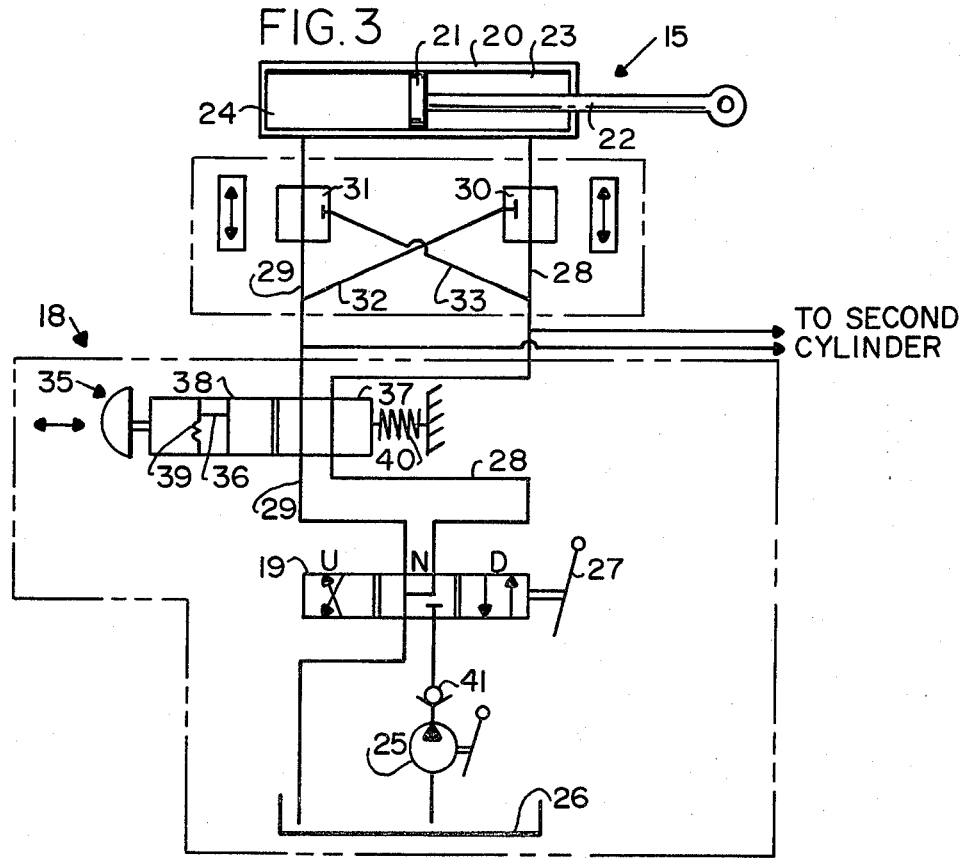

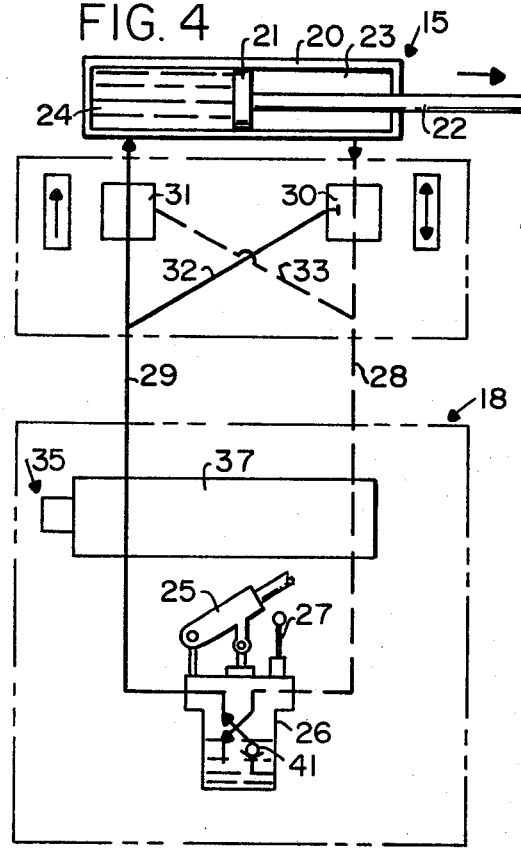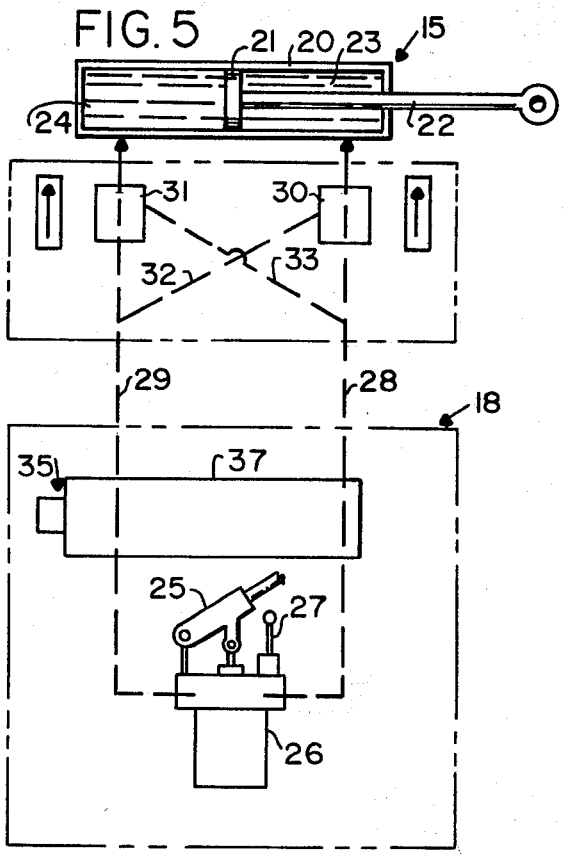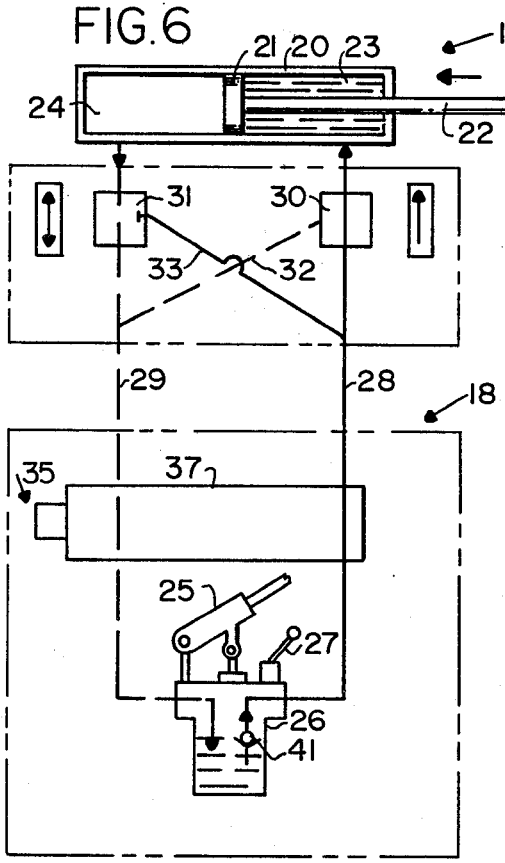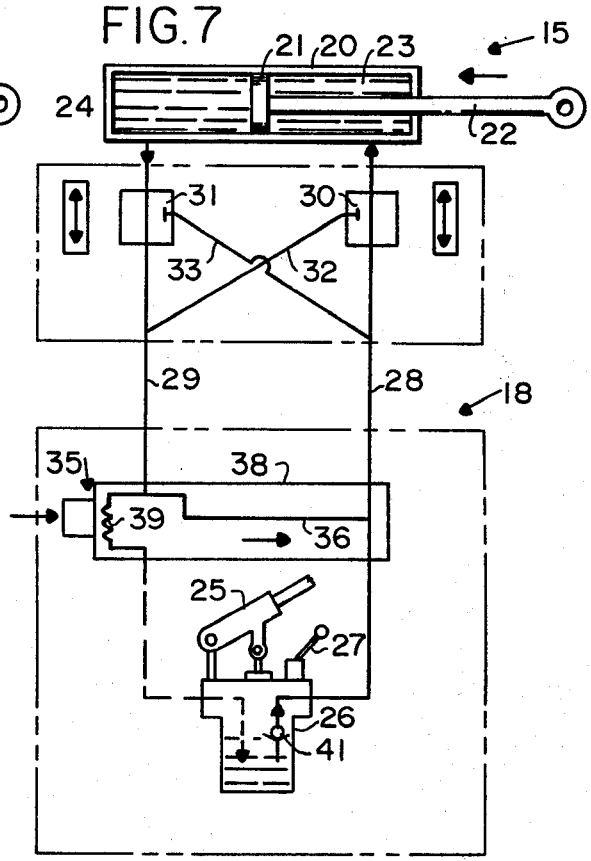

HYDRAULIC CAB TILTING SYSTEM HAVING FULL LOCKING WITH CONTROLLED FREE-FALL

This invention relates to a hydraulic tilt system for a cab-over-engine type of truck.

BACKGROUND OF THE INVENTION

Many trucks have a cab which is normally directly over the engine and can be tilted forwardly to expose the engine for repair and adjustment. An hydraulic power system for so tilting the cab comprises an hydraulic piston and cylinder assembly with one end attached to the chassis and the other end attached to the cab. When the assembly is in its retracted position, the cab is in its driving position. The assembly can be fully extended to tilt the cab through an angle of approximately 90° to give full vertical exposure to the engine and componentry therebeneath. However, full 90° tilt is rarely needed, for most engine repair and maintenance work can be done with the cab at an angle of about 45°. During approximately 45° of movement, the weight of the cab exerts a force tending to oppose that movement, and if the hydraulic force were released, the cab would fall freely back to the driving position. Also, if the cab is moved beyond the balanced position, it exerts a pulling force on the piston and the piston rod, tending to accelerate its movement. In other words, when the cab is moved past the balanced position, only hydraulics prevents it from falling freely.

As a precaution against accidental cab fall, for example in the event of an unexpected loss in hydraulic pressure, the trucks require a safety system to prevent free-fall by blocking the hydraulic fluid and locking the cylinder and piston assembly. Also, it is important to be able to lock the cab in any intermediate position. Further, it is important to maintain control and provide for user safety by assuring locking of the cab whenever the cab tilting system is not in active use.

Manual work is required to operate the pump which tilts the cab; so the cab is only raised up to the point needed, thus eliminating unnecessary additional work. Since the fully tilted position is rarely needed, the cab is usually tilted up to about 45°; this sufficiently exposes the engine and componentry for routine maintenance. Controlled return free-fall, or gravity induced lowering of the cab, is desired for between the balanced position (about 45°) and the driving position, since it eliminates the work required to pump the cab back down. Controlled free-fall in the direction between the balanced position and the fully tilted position is not as important as free fall in the return direction, because this range of tilt is so infrequently used.

Two principal approaches have been taken in the prior art attempts at solving the problems of free-fall and safety stopping; only one of the two problems is solved in any one prior system.

One such approach was to prevent free-fall altogether. In a system, such as that described in U.S. Pat. No. 3,472,547 to London, a pressure-controlled safety valve was used to hold the cab in any pivoted position. This system required that the cab be pumped through its entire range of travel from 0° to 90°, full tilt and back.

The other approach was to control free-fall, but this approach did not enable the cab to be locked in any intermediate position. Free-fall control could be obtained by a fluid-flow responsive restriction in the hydraulic fluid return line. U.S. Pat. No. 3,761,123, to Neill, et al. discloses a flow controller having a velocity fuse plus a bypass conduit with a fixed restricted orifice or, alternatively, a pressure-compensated flow-control valve. This system did not, however, provide for emergency arrest of the cab's movement, but merely slowed down that movement. Other systems, such as that of U.S. Pat. No. 3,972,557 to Hudston et al. illustrate combinations of check valves and flow restrictors, such as a lock valve in the lower hydraulic fluid inlet line and a unidirectional speed restrictor in the upper inlet line.

An object of this invention to to provide both controlled free-fall from the balanced position back to the normal driving position, and safety protection from an inadvertent loss of hydraulic pressure, both of which are controlled from a common centralized location. In addition, the cab can be purposely locked at any desired degree of tilt.

Another object of this invention is to provide on operator safety switch with "dead-man type" emergency stopping of cab movement, requiring constant manual pressure during controlled free-fall.

SUMMARY OF THE INVENTION

The invention introduces a manual spring-loaded control valve into the system in such a manner that hydraulic pressure produced by the nesting force of the cab in the under-center position causes fluid to bypass the pump and flow from the pressure side of the cylinder to the non-pressure side of the cylinder through a crossover line. The difference in volume between the two sides of the cylinder, due to the volume displaced by the piston rod, is bled off through a suitable restrictor located in a manual spring-loaded control valve that controls the rate of "free-fall" or purposely allowed, gravity-induced lowering of the cab. This valve requires two sequential actions to initiate the controlled "free-fall" response, the second action being a continuously applied manual force which upon release results in immediate locking that prevents any further cab descent and potential injury. The hydraulic circuit has pressure controlled check valves associated with each cylinder for emergency stopping of cab fall in case of hydraulic pressure loss.

These and other objects of the invention will become more apparent to those skilled in the art by reference to the following detailed description.

BRIEF DESCRIPTION OF THE DRAWINGS

FIG. 1 is a diagrammatic view of a tilt-cab truck of the kind embodying the principles of the invention, showing it in the balanced, or center position.

FIG. 2 is a view of the same, showing the fully tilted cab.

FIG. 3 is a hydraulic circuit diagram showing one cylinder of the hydraulic cab tilting system embodying the principle of the invention; the broken line boxes identify elements which are disposed at a common location, preferably in two integral units.

FIG. 4 is an hydraulic circuit operational flow diagram showing the circuit of FIG. 3 with the valve set in position to lift the cab; solid flow lines indicate pressure applied, and the broken return line indicates pressure relief flow, or zero flow.

FIG. 5 is a similar view of the same circuit flow diagram as FIG. 4, in its locked position so that the cab cannot move either up or down; the broken lines indicate zero flow.

FIG. 6 is a similar view showing the circuit diagram of FIG. 4 in a position where the cab is being pumped down; the solid flow line indicates pressure applied and the broken return line indicates pressure relief flow or zero flow.

FIG. 7 is a similar view of the same hydraulic circuit diagram, with the valve in position for controlling free-fall of the cab, shown after the initial pump stroke.

DESCRIPTION OF A PREFERRED EMBODIMENT OF THE INVENTION

FIGS. 1 and 2 show a typical cab-over-engine type of truck. A main frame 11 rests on wheels 12 via suspension, axles, etc. (not shown), and a cab 14 is pivotally mounted to the frame. At least one hydraulic piston-cylinder assembly 15 is pivotally secured at one end 16 to the frame 11 and at the other end 17 to the cab 14. Actuation of the piston-cylinder assembly 15 through a pumping and control unit 18 having a conventional three-position valve 19 produces corresponding movement of the cab 14. The cab 14 may either be in its normal driving position (not illustrated), or its balanced, or center position (shown in FIG. 1) where it could theoretically fall in either direction down (not illustrated) or in its fully tilted position (shown in FIG. 2) or, of course, in intermediate positions.

The hydraulic cab tilting system of the invention comprises one or more hydraulic piston-cylinder-assemblies 15, each having a cylinder 20, a piston 21, and a piston rod 22, which are controlled from a single unit 18, as illustrated in FIG. 3. For purposes of illustration the other cylinders are not shown, and the system will be described with reference to only one cylinder assembly 15; in practice, the cylinders are substantially identical. The cylinder 20 has an upper right-hand section 23 disposed above the piston 21, for receipt of pressurized hydraulic fluid, and a lower left-hand section 24 disposed below it. The control unit 18 comprises a single hydraulic pump 25 with a reservoir 26 for storing hydraulic fluid. The pump 25 is connected to the conventional three-position valve 19 which is controlled by a mode selector lever 27 having three positions: up, stop, and down.

Connecting the hydraulic piston-cylinder assemblies to the control station 18 is a circuit of hydraulic lines. The pump 25, through the valve 19, is connected to the upper cylinder section 23 by a first hydraulic line 28, and to the lower cylinder section 24 by a second hydraulic line 29. A first pressure controlled check valve 30 is disposed along the first line 28 between the upper cylinder section 23 and the pump 25. A second pressure controlled check valve 31 is similarly disposed along the second line 29 before the lower cylinder section 24. A crossover pressure control line 32 connects the first valve 30 to the second line 29 for pressure actuation, and a second crossover pressure control line 33 is similarly connected between the second valve 31 and the first line 28. The pressure controlled check valves 30 and 31 normally permit flow only into the cylinder 20. When the pressure from a crossover pressure control line 32 and 33 reaches a pre-determined limit, the corresponding pressure controlled valve 30 or 31 automatically opens to enable fluid flow in either direction.

A manual override valve 35 for controlled free-fall is located at the control unit 18 and is connected across the second line 29 between the three position valve 19 and the second valve 31. The override valve 35 is also connected to the first line 28 at a point between the three position valve 19 and the first valve 30. The override valve 35 has two positions, a first or normally open position 37 (FIGS. 4 to 6) which opens unrestricted flow along the two lines 28 and 29 as if the override valve were not present at all, and a second or controlled free-fall position 38 (FIG. 7) which opens a connection between the first and second lines within a valve passageway 36 and which restricts fluid flow between the lower cylinder section 24 and the reservoir 26 through a flow restrictor 39 disposed in the valve 35 in the flow of the second line 29. The override valve 35 has a spring 40 designed to require constant manual pressure to hold the valve in the second or controlled free-fall position 38. The spring 40 acts on the valve 35 so that it automatically assumes the first, normally open position 37 immediately upon manual release, in "dead man switch" fashion. Another check valve 41 is disposed between the three way valve 19 and the reservoir 26 to prevent flow backwards into the reservoir from line 28 when the manual override valve 35 is in the controlled free-fall position 38, and also prevent flow backwards in the pump 25 when pumping.

FIGS. 4–7 are somewhat schematic operating flow diagrams which illustrate the pressure components, fluid flow directions, and valve settings for the various modes of operation of the hydraulic cab tilting system of the invention. For clarity purposes, as in FIG. 3, the system is illustrated as being spread out, whereas in construction the upper portion of the device (the top broken line box) is normally a part of the piston cylinder assembly 15 and the lower portion of the device (the bottom broken line box) is all a part of the control unit 18. The boxes with arrows next to the check valves 30 and 31 show the fluid flow mode for these valves. Broken hydraulic fluid lines indicate return flow or zero flow.

The cab lifting mode is shown in FIG. 4. The mode selector lever 27 is in the "up" position, and the manual override valve 35 is in its first position 37, for normal fluid flow. The hydraulic pump 25 is operated to pump fluid to the second line 29, through the override valve 35, through the second check valve 31 in its normal direction of flow, and into the lower cylinder section 24. As more fluid is pumped into the lower cylinder section 24, the pressure in the second line 29 and in the second crossover pressure control line 32 increases to a pre-set level, whereupon the first check valve 30 opens to its controlled position so that fluid flows from the upper cylinder section 23 out through the first line 28 and into the reservoir 26, thereby freeing the piston 21 to move across the cylinder 20 and raise the cab 14 via the piston rod 22. A loss of pumping pressure, due to leakage or between pump strokes, decreases the pressure in the crossover pressure control line 32, thereby returning the first control valve 30 to its normal one-way position. Flow out of the cylinder 20 would be stopped, and the cab's movement would halt.

FIG. 5 shows the same circuit, but, the cab is held in a locked position so that it cannot move up or down. This is done by setting the valve 19 via the mode selector lever 27 to the neutral position. The check valves 30 and 31 prevent the fluid from flowing out of either end of the valve since, in the neutral position there is not sufficient pressure in the crossover pressure control lines 32 and 33 to move the check valves to their free-flow mode. It makes no difference which direction the weight of the cab might tend to move the piston; it cannot move in either direction.

FIG. 6 shows the system set for pumping the cab 14 down. The selector lever 27 is placed in its down position. Fluid is pumped through the first line 28 and through the first check valve 30 to urge the piston 21 to the left. The crossover pressure control line 33 transmits built up pressure from the first line 28 to the second check valve 31, opening it to permit flow in either direction. Each pump stroke, therefore, opens the second valve 31 and moves the cab back toward the down position. The hydraulic fluid returns through the second check valve 31 and the manual override valve 35 into the reservoir 26.

FIG. 7 shows the system as it is used for controlled free-fall of the cab from the balanced position back to the at-rest or down position on the frame. The mode selector lever 27 is in the "down" position, and the manual override switch 35 is held in its second position 38. The cab 14 exerts a downward force on the piston rod 22, but is held in place by the closed second check valve 31. By using the pump 25, pressure is increased along the first line 28 and in the second crossover pressure control line 33 to open the second check valve 31 to two-way flow. Hydraulic fluid flows from the lower cylinder section 24, past the second valve 31, through the manual override valve 35, through the cross passageway 36, up the first line 28, through the first valve 30 and into the upper cylinder section. The upper cylinder section 23 holds less hydraulic fluid than the lower cylinder section 24, due to the volume displaced by the piston rod. The difference between these two volumes of fluid passes through a flow restrictor 39 in the manual override valve 35, to the reservoir 26. Therefore, the rate of displacement of the hydraulic fluid in the lower cylinder section is limited by the maximum rate of flow through the restrictor 39, giving the controlled free-fall of the invention. The pressure of the fluid in the lines, as caused by the weight of the cab bearing down on the cylinder, keeps the second check valve 31 open via the second cross-over pressure control line 33, thereby eliminating the need for continuous pumping action.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. An hydraulic tilt system for a cab pivotally mounted on a motor vehicle frame, adapted for full safety locking and controlled cab return free-fall, comprising:
    an hydraulic piston-cylinder assembly pivotally connected between the cab and its frame,
    a remotely located control station having an hydraulic pump with an "up" position and a "down" position, an hydraulic fluid reservoir, and control means for actuating said pump to either of said positions and selecting the direction of tilting said cab,
    hydraulic lines connecting said hydraulic piston-cylinder assembly with said control station,
    first valve means in said hydraulic lines at said assembly, for automatically blocking said lines and stopping the tilting motion of the cab upon loss of hydraulic pressure, and
    controlled return free-fall and safety lock second valve means at said control station in the path of said hydraulic lines for automatically locking said cab against free-fall movement when the pump is in "down", position and said cab is in a position where except for said automatic locking it would ordinarily free-fall, said second valve means upon manaul actuation and manual retention, enabling unlocking and free-fall of said cab at a controlled rate from such a locked position, locking occurring again whenever manual control is released.

2. An hydraulic cab tilting system for a cab pivotally mounted on a motor vehicle frame, adapted for full safety locking and controlled cab return free-fall, comprising:
    an hydraulic piston-cylinder assembly pivotally connected between the cab and its frame,
    a remotely located control station having an hydraulic pump, an hydraulic fluid reservoir, and control means for actuating said pump and selecting the direction of tilting said cab,
    hydraulic lines connecting said hydraulic piston-cylinder assembly with said control station,
    first valve means in said hydraulic lines at said assembly, for automatically blocking said lines and stopping the tilting motion of the cab upon loss of hydraulic pressure, and
    controlled return free-fall valve means at said control station in the path of said hydraulic lines for manually controlling the free-fall of said truck cab, said controlled return free-fall valve means being connected to said hydraulic lines between said pump and said piston-cylinder assembly and comprising:
    a valve having two positions,
    a first position providing means enabling uninterrupted flow along said hydraulic lines, and
    a second position for controlled free-fall providing short-circuit means connecting together the hydraulic lines leading to the opposite ends of said piston-cylinder assembly and flow resistance means for interposing flow restriction between said piston-cylinder assembly and said hydraulic fluid reservoir so as to recirculate most fluid flow from one end of said cylinder to its opposite end while gradually bleeding some fluid off into said reservoir, and
    safety lock means for automatically urging said valve toward said first position and holding it there and a manual pressure switch to move said valve to, and to retain it in said second position as long as there is direct manual pressure thereon.

3. The hydraulic cab tilting system of claim 2 wherein said first position comprises a plurality of unobstructed passageways through said valve, interposed in said hydraulic lines, and
    said second position comprises a cross-passageway connecting together the hydraulic lines going to the opposite ends of the piston-cylinder assembly and another passageway having a flow restrictor, connecting said cross-passageway to a said hydraulic line leading to said reservoir.

4. The hydraulic cab tilting system of claim 1 or 2 wherein:
    said controlled return free-fall valve means has a pump side and a cylinder side,
    said pump has an inlet and an outlet, said pump inlet being connected by a hydraulic line to said reservoir, and said pump outlet being connected by a hydraulic line to the pump side of said control means, said control means also being connected at its pump side by a hydraulic line to said reservoir, and said control means being connected at its cylinder side to the pump side of said controlled free-fall valve means by at least two hydraulic lines.

5. The hydraulic cab tilting system of claim 1 or 2 wherein said hydraulic piston-cylinder assembly comprises:
   a cylinder having two ends
   a piston disposed within said cylinder,
   a piston rod disposed partly within said cylinder and connected to said piston, said piston rod extending through one end of said cylinder and being pivotally connected to said cab, and
   two hydraulic line connection openings, one substantially at each end of said cylinder.

6. The hydraulic cab tilting system of claim 5 having a plurality of hydraulic piston-cylinder assemblies pivotally connected between the cab and its frame, each of said hydraulic piston-cylinder assemblies being connected to said hydraulic lines, said control station, said first valve means, and said controlled return free-fall valve means.

7. The hydraulic cab tilting system of claim 1 or 2 wherein said first valve means comprises:
   a pressure-controlled check valve connected to each said hydraulic line at a point substantially adjacent to the connection of said line to said cylinder, and
   crossover-pressure control lines connecting each said check valve to the hydraulic line leading to the other end of the piston-cylinder assembly to which it is connected at a point between said control station and said other check valve.

8. An improvement in an hydraulic tilt system having full locking capability and controlled return free-fall for a cab pivotally mounted on a motor vehicle frame wherein the system includes a hydraulic piston-cylinder assembly connected by a pair of hydraulic lines to an hydraulic pump, the improvement comprising:
   a manual override valve for controlled return free fall, said override valve being disposed along said hydraulic lines between said pump and said piston-cylinder assembly,
   said manual override valve having two positions: a first, normally open position wherein said valve opens to uninterrupted fluid flow along both said hydraulic lines, and a second, controlled free-fall position wherein said valve connects said two hydraulic lines together for flow from one end of said cylinder to its other end and restricts flow from said piston-cylinder assembly to the reservoir,
   said valve having means requiring constant manual pressure to hold it in the second, controlled free-fall position and having automatic means for returning it to the first normally open position upon the release of said manual pressure.

9. The improvement in an hydraulic tilt system of claim 8 wherein said system has two similarly connected hydraulic piston-cylinder assemblies.

10. The improved hydraulic cab-tilting system of claim 8 or 9 wherein
    said manual override valve is disposed near said hydraulic pump and comprises two pathways connecting said hydraulic lines to said hydraulic pump for said first open position, and for said second position comprises a first pathway connecting said two hydraulic lines together at the piston-cylinder assembly side of said valve, and a second pathway having a flow restriction therein connecting said first pathway and said hydraulic line leading to said reservoir.

11. A method of safely controlling the return free fall of a truck cab from its balanced position to its driving position using a hydraulic cab tilting system having a hydraulic circuit, hydraulic fluid, a reservoir, and a hydraulic piston-cylinder assembly, wherein the volume of the cylinder top is less than the volume of the cylinder bottom due to the displacement of the piston rod, the method comprising the steps of:
    opening the hydraulic system for free flow between the cylinder top and the cylinder bottom when the cab is in the balanced position,
    pumping the system once in the direction of free fall desired, and
    restricting the flow of hydraulic fluid between the hydraulic circuit and the reservoir, said flow being of fluid for the difference in the volumes of the cylinder top and the cylinder bottom, the flow velocity of said difference in volume being proportional to the velocity of cab free fall.

12. The method of claim 11 further including the step of:
    automatically closing the hydraulic system to flow between the cylinder top and the cylinder bottom upon the release of a manually depressed valve.

13. An hydraulic tilt system for a cab pivotally mounted on a motor vehicle frame, adapted for full safety locking and controlled free-fall cab return, comprising:
    an hydraulic piston-cylinder assembly for tilting, connected between a truck's cab and its frame,
    an hydraulic fluid reservoir,
    an hydraulic fluid pump, communicating with said reservoir,
    an hydraulic fluid circuit connecting said pump to said piston-cylinder assembly, including separate lines between said pump, one going to one end and the other to the other end of each said piston-cylinder assembly,
    hydraulic fluid directional control means associated with said pump,
    a pressure controlled check valve disposed along each said hydraulic fluid line between said directional control means and said piston-cylinder assembly,
    crossover pressure control lines connecting each of said pressure controlled check valves to the hydraulic fluid line leading to the other end of the piston-cylinder assembly at a point between said directional control means and the pressure controlled check valve associated with said other end of the piston-cylinder assembly, and
    a manual override valve for controlled return free-fall disposed along said hydraulic fluid lines at a point between said directional control means and said crossover pressure control lines, said override valve having a first normally open position for unimpaired flow along said hydraulic fluid lines, and a second, manually actuated, controlled free fall position which opens a circuit between the two hydraulic fluid lines associated with said piston-cylinder assembly and which introduces a resistance to flow between said circuit and said reservoir, constant manual pressure being required to hold said manual override valve in the second, controlled free-fall position.

14. The hydraulic cab tilting system of claim 13 wherein said hydraulic pump, said reservoir, said directional control means, and said manual override valve are all disposed at substantially the same location, forming a control center for said cab tilting system.

15. The hydraulic cab tilting system of claim 13 having a pair of hydraulic piston-cylinder assemblies.

16. The hydraulic cab tilting system of claim 15 wherein said pressure controlled check valves are disposed substantially adjacent to said hydraulic piston-cylinder assemblies along said hydraulic fluid circuit.

* * * * *